United States Patent [19]

Brean

[11] 3,710,375

[45] Jan. 9, 1973

[54] OPTICAL ENCODER

[75] Inventor: John W. Brean, Cincinnati, Ohio

[73] Assignee: D. H. Baldwin Company, Cincinnati, Ohio

[22] Filed: Oct. 20, 1971

[21] Appl. No.: 191,024

[52] U.S. Cl. ....................340/347 P

[51] Int. Cl. ....................G08c 9/06

[58] Field of Search......340/347 P, 347 SY, 347 AD; 250/219 D

[56] References Cited

UNITED STATES PATENTS 3,618,074 11/1971 Brean....................340/347 P

*Primary Examiner*—Thomas A. Robinson
*Attorney*—Marshall A. Burmeister et al.

[57] ABSTRACT

An optical encoder is disclosed utilizing a V-scan method of read-out which provides the output for each track of a code disc and the complementary output of that track. Each track, except the least significant track of the code disc, is provided with two pair of photocells, one to produce the leading and complementary leading output and the other to produce the lagging and complementary lagging output. A novel electrical circuit is utilized by the encoder to reduce the number of components required in obtaining a parallel output and parallel complementary output, the complementary output being obtained at the code disc.

9 Claims, 6 Drawing Figures

Inventor
John W. Brean
By Burmeister, Palmatier & Hamby
Attorneys

Inventor
John W. Brean
By Burmeister, Palmatier & Hamby
Attorneys

Inventor
John W. Brean
By Burmeister, Palmatier & Hamby
Attorneys

Inventor
John W. Brean
By Burmeister, Palmatier & Hamby
Attorneys

OPTICAL ENCODER

The present invention relates to analog to digital encoders, and more particularly to optical encoders for digitizing shaft angle positions.

Digital computers require inputs in digital form, and shaft angle analog to digital encoders are employed to convert the angular position of a shaft to a digital output suitable for use in a computer. Two types of shaft angle analog to digital encoders have been in relatively wide use. The brush type of encoder utilizes a rotatable drum or disc mounted on the shaft to be encoded which is provided with a plurality of tracks of conducting areas spaced by non-conducting areas. Each of the tracks of the rotatable member is read by a brush which slideably engages the track so that the converter produces a unique output for a plurality of sectors which extend from a zero position throughout one or more revolutions of a shaft. A second type of shaft angle digital encoder in common use is the photoelectric encoder in which a code disc is mounted on the shaft to be encoded and provided with a plurality of coaxial tracks of alternate transparent and opaque sectors. A light source is disposed on one side of the code disc, and separate photocells are mounted confronting each track of the code disc on the opposite side of the light source and in alignment with the light source.

It has been known in brush type encoders to utilize the V-scan method of read-out in which the least significant track of the code member is sensed by a single brush and the more significant tracks of the code disc are sensed by two brushes which are spaced to a lag and a lead position on the track of the code member. Some means is employed to select either the lead or the lag read-out brush in accordance with the output of the immediately less significant track of the code member. The use of the V-scan method of read-out eliminates ambiguities in reading the more significant tracks of the code member, and thus an encoder using the straight binary code achieves the freedom from ambiguities which is achieved by the more complicated Gray code. U.S. patent application Ser. No. 698,739 of John W. Brean, the present inventor, and Paul P. Stiedle entitled "Optical Encoder", now U.S. Pat. No. 3,618,074, dated Nov. 2, 1971, discloses a novel photoelectric encoder utilizing the V-scan method which overcomes many of the limitations of prior optical encoders utilizing the V-scan method of read-out.

With brush type encoders, the V-scan method of readout has been accomplished employing self-switching within the encoder. As described in "Notes on Analog-Digital Conversion Techniques" by Alfred K. Susskind, published by John Wiley & Sons, Inc., New York, 1957, pages 6–49 through 6–55, the use of a pair of complementary tracks for each track of the code disc and coupling diodes between tracks achieves the desired electrical connections between lag and lead brushes confronting each track of greater significance. Another advantage of the self-switching V-scan method of read-out is that not only the desired or "-true" digital output is obtained, but also a complementary output is obtained on separate output terminals. It is one of the objects of the present invention to provide an optical encoder with a V-scan method of read-out which produces a true digital output representing shaft angle position and the complement of the true digital output which is desirable for error detection.

The complement of the true digital output may be obtained by utilizing an inverter between each output terminal and an output terminal for the complement. It is, however, an object of the present invention to provide a V-scan method of read-out for an optical encoder which also produces the complement of the true digital output, and produces this complement at the disc without requiring additional electronic devices.

It is a further object of the present invention to provide an optical encoder to produce a true digital output representing shaft angle position and the complement of the digital output at a cost less than conventional encoders.

It is also an object of the present invention to provide an encoder with a V-scan read-out system using either photoconductive or photovoltaic cells.

For a better understanding of the present invention, together with other and further objects thereof, reference is made to the following description taken in connection with the accompanying drawings, in which.

Figure 1:
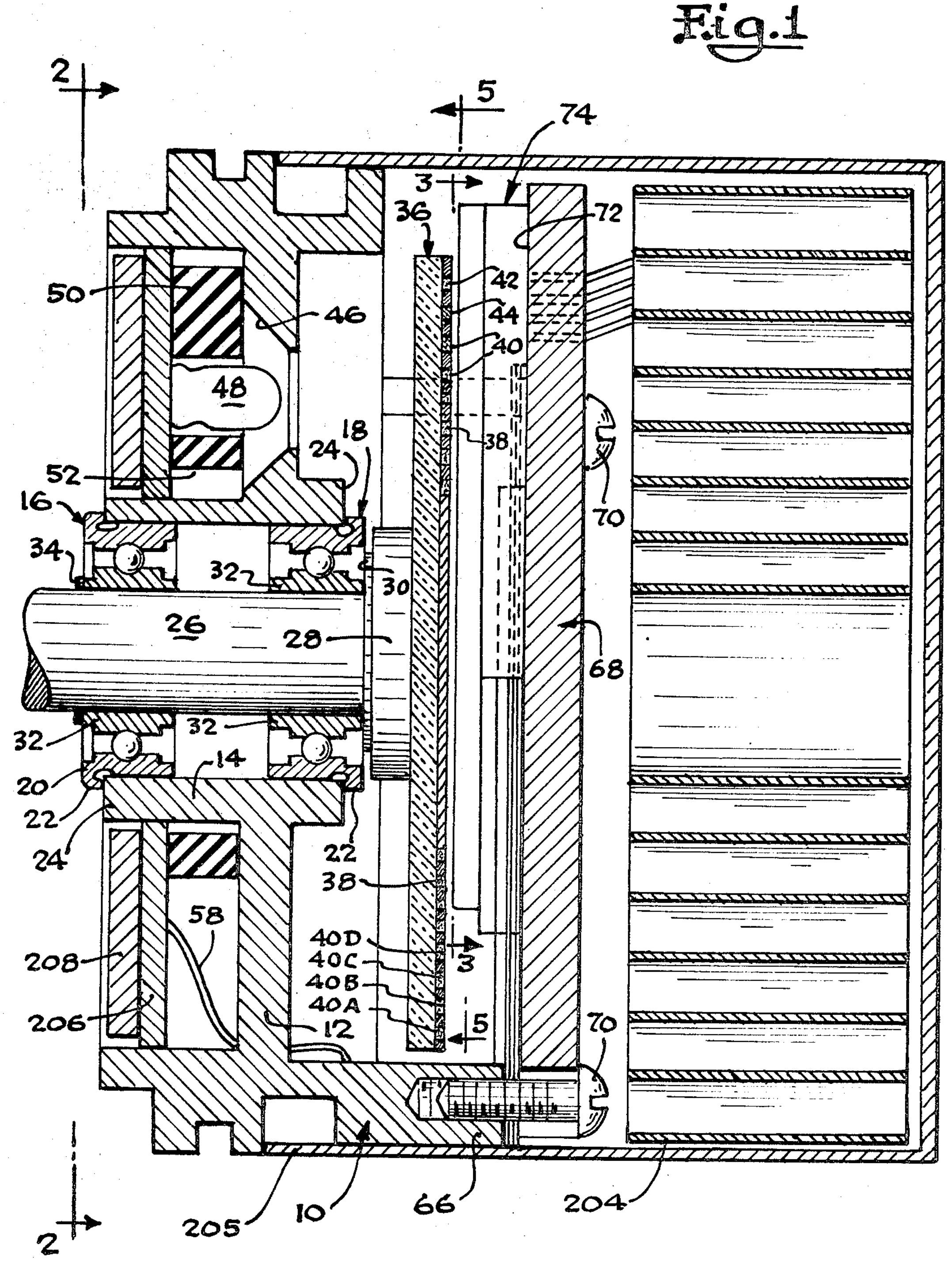
FIG. 1 is a sectional view of the encoder constructed according to the present invention, the section being taken along the axis of the shaft to be encoded.
Figure 2:
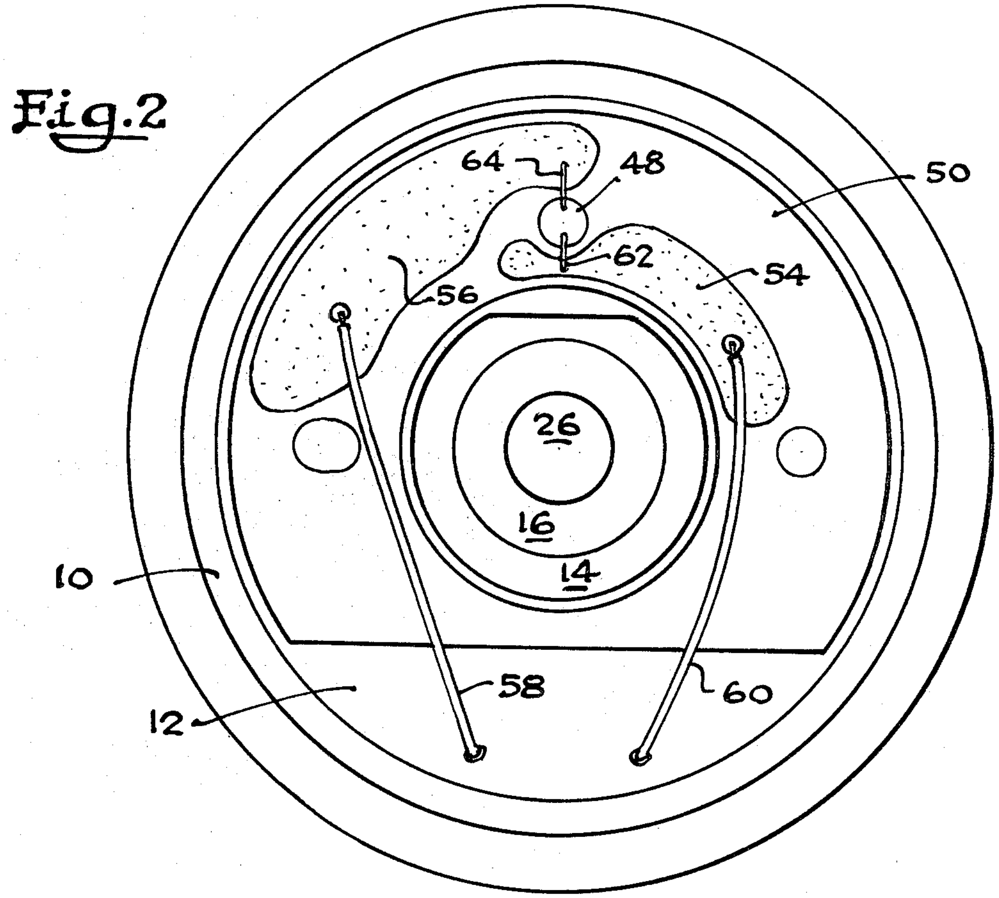
FIG. 2 is an end elevational view of the encoder of FIG. 1, the cover having been removed for illustrative purposes.
Figure 3:
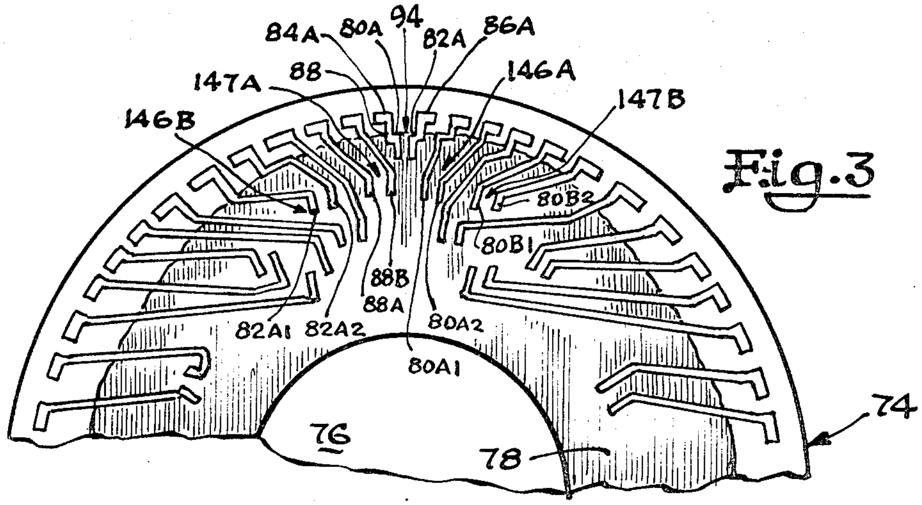
FIG. 3 is a sectional view taken along the line 3—3 of FIG. 1.

As indicated in FIGS. 1 through 3, the analog to digital encoder has a cylindrical shell 10 which has integrally therewith a wall 12 normal to the axis of the cylindrical shell 10. The wall 12 is integral with a sleeve 14 disposed coaxially about the axis of the shell 10, and two ball bearing assemblies 16 and 18 are mounted within the sleeve 14. Each of the ball bearing assemblies 16 and 18 has an outer race 20 provided with an outwardly extending annular flange 22 which abuts one of the ends 24 of the sleeve 14. In this manner, the outer race 20 of the ball bearing assemblies 16 and 18 are restricted in their movement toward each other.

A rotatable shaft 26 is disposed within the ball bearing assemblies 16 and 18 to transmit the analog information from a movable element to a code member, which is described hereafter, and the shaft is provided with an outwardly extending hub 28 at one end,which has a surface 30 abutting the inner race 32 of the ball bearing assembly 18. The inner race 32 of the ball bearing assembly 16 is securely affixed on the shaft 26, as by cement 34, and the inner races 32 of the ball bearing assemblies 16 and 18 are urged toward each other by pretensioning the inner races 32 prior to applying the cement 34, thereby reducing the free play of the ball bearing assemblies 16 and 18.

The code member is in the form of a circular disc 36 which is affixed on the hub 28 coaxially about the shaft 26. The code member could also be in the form of a translatable linear member or a rotatable cylinder, if desired, but a disc is usually preferable. The code disc 36 is constructed of transparent material, such as glass, and is provided with an opaque layer 38 on its surface remote from the shaft 26. The opaque layer 38 may be a developed photographic emulsion, and the disc 36 is provided with a plurality of tracks 40 which extend coaxially about the axis of the shaft 26. Each of the tracks 40 is divided into a plurality of transparent sectors 42 spaced by opaque sectors 44 to form the code disc, and the transitions between the sectors are along axes normal to the track, which in the case of a disc are radial. The particular code disc utilized in the encoder of the present invention is a natural binary disc, such as shown on pages 6–41 of "Notes on Analog-Digital Conversion Techniques" by Alfred K. Susskind, copyright 1957 by the Massachusetts Institute of Technology.

The wall 12 of the shell 10 is provided with an opening 46 which confronts one side of the code disc 36. A lamp 48 is mounted on a disc 50 of electrically insulating material which is disposed within the shell 10 and has a circular aperture 52 surrounding the sleeve 14 in order to position the lamp 48 within the opening 46. The disc 50 is provided with two electrically conducting lands 54 and 56, and a pair of conductors 58 and 60 make contact with the lands 54 and 56. The lamp 48 has two terminals 62 and 64 which are electrically connected to the lands 56 and 54, respectively. The conductors 58 and 60 are connected to a source of direct current in order to maintain the lamp 48 in continuous illumination.

The shell 10 is provided with a plurality of outwardly extending posts 66, and a circular plate 68 abuts the end of the posts 66 on the opposite side of the code disc 36 from the shell 10. The plate 68 is secured in position by a bolt 70 threadably engaging each of the posts 66. One of the surfaces of the plate 68, designated 72, confronts the code disc 36, and a photocell assembly 74 is mounted on the surface 72 confronting the code disc 36 in a region aligned with the lamp 48. The photocell assembly 74 is illustrated in FIG. 3, and has a photocell confronting each of the tracks 40 of the code disc 36 in alignment with the lamp 48.

FIG. 3 illustrates a photoconductive photocell assembly 74 in accordance with one embodiment of the present invention. The photocell assembly 74 has a base plate 76 of electrically insulating material, such as glass. A strip of photoconductive material 78 is disposed upon the base 76 and generally disposed in an arc. The photoconductive layer 78 is preferably a composition formed by any combination of a cation material from the group consisting of cadmium, lead, indium, mercury, gallium, zinc and aluminum, with an anion material from the group consisting of sulphur, selenium, tellurium, antimony, and arsenic. Cadmium selenide has been found to be a particularly desirable material for the layer 78 of photoconductive material. A pair of electrodes designated 80A and 82A are disposed confronting the outermost or least significant track 40A of the code disc 36, and these electrodes 80A and 82A are disposed upon the layer 78 of photoconductive material and spaced by a distance no greater than the sector length of the transparent sectors of the outermost track 40A of the code disc 36. The electrodes 80A and 82A are in the form of thin films of electrically conducting material disposed on the layer 78 of photoconductive material, and the electrodes 80A and 82A are connected to terminal lands 84A and 86A, respectively, by strips 88 of electrically conducting material which extend from the electrodes across the photoconductive material 78 and the base 76.

The electrodes 80A and 82A define the photocell designated 94 confronting the least significant track 40A of the encoder. This photocell 94 determines the read-out axis of the encoder, illustrated in FIG. 5 and designated 81.

The immediately inner coaxial track of the code disc 36 is designated 40B and is a track of next greater significance over the track 40A. Two pairs of photocells confront this track, the one pair being referred to as the lagging photocells and designated 146A and 146B, these photocells being designated in FIG. 5 additionally $L_A$ and $L_A'$, and the other pair of photocells being termed the leading photocells and bearing reference numerals 147A and 147B, these latter photocells also bearing the legend $L_E$ and $L_E'$. The track of next greater significance is immediately inward from the track 40B and has been designated as track 40C. Track 40C also has two pairs of photocells confronting it, one of the pairs being designated as the lagging photocells and bearing reference numerals 194A and 194B, and the other pair being designated as the leading photocells and bearing reference numerals 195A and 195B.

In like manner, the next inner track has been designated 40D, and the track 40D is the immediately more significant track than the track 40C. The track 40D has two pairs of photocells confronting it, the one pair being designated the lagging photocells and bearing reference numerals 200A and 200B, and the other pair being designated the leading photocells and bearing reference numerals 201A and 201B.

As illustrated in FIG. 3, the photocell 146A is formed by a pair of electrodes $80A_1$ and $80A_2$ disposed on the layer 78 of photoconducting material. In like manner, the photocell 146B is formed by electrodes $82A_1$ and $82A_2$. The photocells of the second pair confronting the track 40A are also formed by a pair of electrodes, the photocell 147A being formed by electrodes 88A and 88B, and the photocell 147B being formed by electrodes $80B_1$ and $80B_2$. In like manner, the photocells confronting the tracks 40B and 40C are formed by pairs of electrodes disposed upon the photoconducting layer 78, and these photocells will not be further described as to their construction.

V-scan optical encoders conventionally utilize a pair of photocells confronting each of the more significant tracks of the code disc. One of the photocells of the pair of photocells is designated as a leading photocell and the other photocell is designated as a lagging photocell. When the code disc is rotating in a direction toward higher count, clockwise in FIG. 5, an electrical signal on any given track of the code disc indicating a "1" causes a selection of the leading photocell of the next more significant track of the code disc. The leading photocell must be displaced in the direction of higher count from the read-out line, but the leading photocell must be displaced by a distance no greater than one half the sector length of its confronting track so that the leading photocell can continue to produce a "1" as long as the signal generated from the next lesser significant track is a "1." In like manner, a code disc of a conventional optical encoder utilizing a V-scan method of read-out when rotating in a direction toward decreasing count, counter clockwise in FIG. 5, will select the lagging photocell of the next more significant track of the code disc if a given photocell produces an electrical signal representing a "0. " The lagging photocell must be displaced toward the direction of lower count from the axis of read-out of the leading photocell by a distance no greater than one-half of the sector length of the track of the code disc it confronts.

Figures 4, 5:
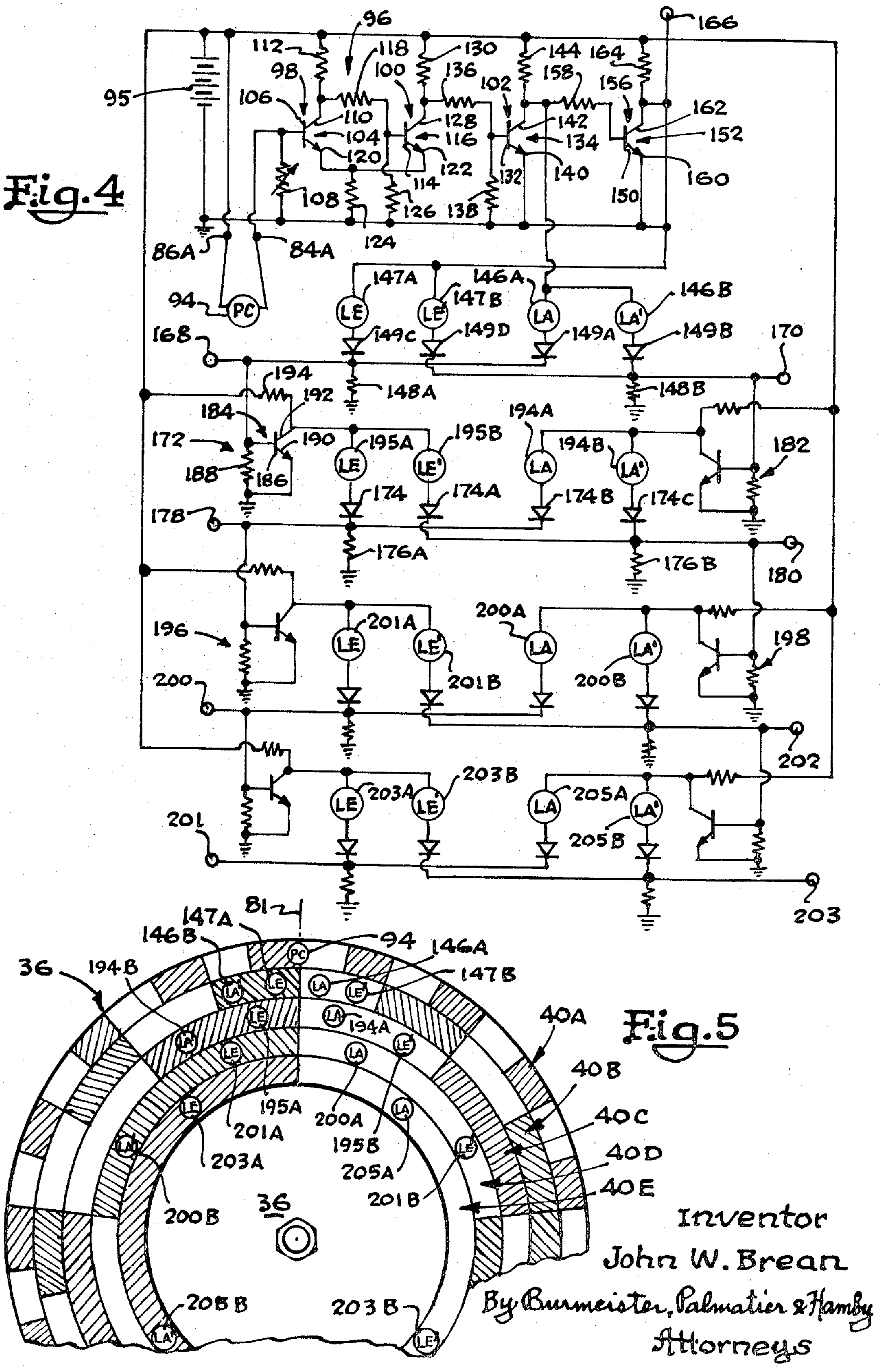
FIG. 4 is a schematic electrical circuit diagram of one embodiment of the encoder of FIGS. 1 through 3.
FIG. 5 is a fragmentary sectional view taken along the line 5—5 of FIG. 1, the figure being simplified to a five track code disc for illustrative clarity.

In accordance with the present invention, each lagging photocell is a photocell of a pair of photocells displaced from each other by a distance of one sector length of the track of the code disc confronted by said cells. Hence, the true lagging cell 146A illustrated in FIG. 5 is displaced from the complementary lagging photocell 146B by one sector length of the track 40B. In like manner, the true leading photocell 147A is displaced from the complementary leading photocell 147B by one sector length of the track 40B. Hence, if the true lagging photocell 146A is producing "0," then the complementary lagging photocell 146B will be producing a "1," and vice versa. In like manner, if the true leading photocell 147A is producing a "1," then the complementary leading photocell 147B will be producing a "0," and vice versa.

The conventional position for the photocell confronting the least significant track 40A of the code disc 36 is at an axis midway between the read-out axes of the true lagging and true leading photocells of the track of next greater significance, namely the photocells 146A and 147A. When utilizing complementary leading and complementary lagging photocells, as illustrated in FIG. 5, then the complementary leading and lagging cells are displaced with respect to the true leading and true lagging cells, respectively by an optimum distance of one sector length. Such a construction could require a light source which would illuminate a very wide region of the disc.

The patent application of the present inventor, John W. Brean, and Paul P. Stiedle, Ser. No. 698,739, referred to above, makes it clear that the read-out axis of any photocell of the encoder may be displaced by two sector lengths of the track it confronts without affecting its operation, and displacing a photocell by two sector lengths in either direction from its normal position may permit more direct utilization of the light source. As will be apparent from FIG. 5, the leading complementary photocell 147B has been displaced two sector lengths in the clockwise direction and the lagging complementary photocell 146B has been displaced two sector lengths in the counter clockwise direction.

While the code disc 36 illustrated five tracks, it is to be understood that the present invention may be practiced with any desired number of tracks on the code disc. Five tracks have been illustrated so that the innermost track 40E may be described in some detail. It is to be noted that the innermost track of the code disc requires the true leading photocell, designated 203A, and the complementary leading photocell, designated 203B, to be disposed on opposite sides of the readout axis of the code disc. In like manner, the true lagging photocell 205A and the complementary lagging photocell 205B are disposed on opposite sides of the readout axis of the code disc, thus requiring a light source covering a very broad area. The light source may be simplified by utilizing an inverter with the true leading photocell to produce the complementary leading photocell, and utilizing an inverter with the lagging photocell, and utilizing an inverter with the lagging photocell to produce a complementary output.

Optical encoders conventionally utilize a read-out slit between the code disc and photocell assembly to improve the resolution of the encoder by restricting illumination of the photocells to precise alignment with the read-out axis on a radius of the code disc. As set forth in the application of the present inventor, John W. Brean and Paul P. Stiedle, Ser. No. 698,739 referred to above, the optical system of the encoder can be greatly simplified by utilizing photoconductive cells employing spaced electrodes disposed at a distance less then one half of the sector length of the transparent sectors of the confronting track of the code disc. U.S. Pat. No. 3,076,959 issued to William Pong entitled "Encoder" teaches the use of photoconductive cells in an encoder with sensitive areas less than the sector length of the transparent areas of the code disc to eliminate optical elements.

FIG. 4 illustrates a preferable electronic circuit for selecting the leading and lagging photoconductive cells of each more significant track of the code disc in response to the output of any given track. While the present invention may be practiced using any method of selecting the leading or lagging photocells of the next more significant track of the code disc, the selection device set forth in FIG. 4 has particular utility in view of its simplicity and low cost. It is to be noted that the selection device set forth in FIG. 4 achieves both the number and its complement with essentially the same number of elements as set forth in the selection device of the application of the present inventor, John W. Brean and Paul P. Stiedle, Ser. No. 698, 739 referred to above.

The photocell 94 formed by the electrodes 80A and 82A and confronting the least significant track of the code disc is utilized to determine the read-out axis of the encoder. Terminal land 86A of the photocell 94 is connected to the positive terminal of a direct current power source 95 illustrated in the form of a battery, and terminal land 84A is connected to the input of an amplifier 96. The amplifier 96 utilizes two transistor stages 98 and 100 followed by an inverter stage 102.

The amplifier stage 98 has a transistor 104 with a base 106 which forms the input terminal and is connected to the terminal land 84A of the photocell 94. The base 106 also is connected to the negative terminal of the power source 95 through an adjustable resistor 108, the negative terminal of the power source 95 forming a common or ground terminal for the electronics unit. The transistor 104 also has a collector 110 connected to the positive terminal of the power source 95 through a resistor 112 and to the base 114 of a second transistor 116 in the stage 100 through a resistor 118. Transistor 106 has an emitter 120 which is connected to an emitter 122 of the transistor 116 and also to the negative terminal of the power source 95 through a resistor 124. The base 114 of the transistor 116 is also connected to the negative terminal of the power source 95 through a resistor 126. Also, the transistor 116 has a collector 128 connected to the positive terminal of the power source 95 through a resistor 130.

The collector 128 of the transistor 116 forms an output terminal for the stage 100 and is electrically connected to the base 132 of a transistor 134 of the inverter 102 through a resistor 136. The base 132 of transistor 134 is also connected to the negative terminal of the power source 95 through a resistor 138. Transistor 134 has an emitter 140 which is connected to the negative terminal of the power source 95, and a collector 142 which is connected to the positive terminal of the power source 95 through a resistor 144.

The photocell 94 is constantly monitoring the illumination incident on the sensitive area of the photocell, and hence the photocell 94 presents either a high resistance between the positive terminal of the power source 95 and the base 106 (when the photocell 94 is not illuminated), or a low resistance between the positive terminal of the power source 95 and the base 106 of the transistor 104 (when the photocell 94 is illuminated). Considering first the photocell 94 to be illuminated, current is injected into the base 106 causing an increased flow of current through the collector-emitter circuit of the transistor 104. Hence, the current injected into the base 114 of the transistor 116 is reduced, causing a relatively small flow of current in the emitter-collector circuit of the transistor 116. As a result of the relatively small flow of current through the transistor 116, the injection of current into the base 132 of the inverter's transistor 134 is increased, resulting in a relatively large flow of current through the collector-emitter circuit of the transistor 134. The potential of the collector 142 is thus relatively low, due to the voltage drop across the resistor 144. As indicated in FIG. 4, one of the photocells of the second least significant track, designated 146A, is connected in a series circuit from the collector 142 to the negative terminal of the power source 95 which includes diode 149A and the resistor 148A. Since the potential of the collector 142 is low, the photoconductive cell 146A will not be actuated and a voltage drop will not be developed across the resistor 148A whether the photoconductive cell 146A is illuminated or not. This is precisely the condition that is desired at the lagging photocell of the second least significant track, since a transition in the least significant track 40A from a "0" to a "1" should not select the lagging photocell of the second least significant track 40B, but rather the leading photocell thereof.

Lagging photocell 146B is also connected between the collector 142 of transistor 134 and the negative terminal of the power source 95 through a series circuit comprising diode 149B and a resistor 148B. However, the collector 142 of the transistor 134 is connected to base 150 of a transistor 152 connected in a second inverter circuit 156 through a resistor 158. The transistor 152 has an emitter 160 connected to the negative terminal of the power source 95 and a collector 162 connected to the positive terminal of the power source through a resistor 164. The second photocell 147A of the pair confronting the second least significant track is connected in a series circuit from the collector 162 of the inverter 156 to the negative terminal of the power source 95 through the resistor 148A and a diode 149C. The relatively low potential of the collector 142 of the inverter 102 results in a decrease in current injection into the base 150 of the transistor 152. Hence, a relatively small current flows through the collector-emitter circuit of the transistor 152, and the potential of the collector 162 is relatively high. Since the photocell 147A is connected between the collector 162 and the negative terminal of the power source 95 through resistor 148A, the photocell 147A is in a condition to respond to illumination, and if illuminated, will present a relatively low resistance resulting in a flow of current through the resistor 148A. If the photocell 147A is not illuminated, then its high resistance will prevent the flow of a significant current through the resistor 148A. It will be recognized that this is precisely the condition required for the lead photocell confronting the second least significant track 40B of the code disc 36.

Complementary lead photocell 147B is also connected between the collector 162 of transistor 156 and the negative terminal of the power source 95 through resistor 148B and diode 149D connected in series. Hence, complementary leading photocell 147B is excited simultaneously with the lead photocell 147A.

The output for the least significant track of the code disc 36, as read by the photocell 94, appears in its amplified form on the collector 162 of the transistor 152, and hence the output terminal 166 for the least significant track is connected to the collector 162. Output terminal 168 for the next more significant digit of the code disc is connected to the junction between resistor 148A and the diodes 149A and 149C. Hence, the signal appearing on the output terminal 168 represents either a lead or a lag output depending upon whether lead photocell 147A or lag photocell 146A is excited. Complementary output terminal 170 is connected to the junction of resistor 148B and diodes 149B and 149D. Hence, the complementary output terminal 170 receives a signal from either complementary lead photocell 147B or complementary lag photocell 146B, depending upon which of these photocells is excited.

The output of the second least significant track which appears on terminal 168 is inverted by the inverter 172 and used to excite the photocells 195A and 195B confronting the third least significant track 40C or the code disc 36. Photocells 195A and 195B are the lead photocell and complementary lead photocell, respectively, confronting the track 40C, and hence, a "0" in the output of the second least significant track 40B on terminal 168 results in exciting the lead photocells confronting the third least significant track of the code disc, as required by the theory of V-scan read-out. The lead photocell 195A is connected in a series circuit with a diode 174, a resistor 176A, and the power source 95, and the junction between the diode 174 and the resistor 176A is electrically connected to an output terminal 178 which carries the output of the third least significant track 40C of the code disc. In like manner, the complementary photocell 195B is connected in a series circuit with a diode 174A, a resistor 176B and the power source 95. The junction between the diode 174A and the resistor 176B is connected to the complementary output terminal for the third least significant track 40C, designated 180.

In like manner, the complementary output of the second least significant track which appears on terminal 170, is inverted by an inverter 182 and used to excite the lagging photocell 194A and the complementary lagging photocell 194B confronting the third least significant track 40C of the code disc. The complementary photocell 194A is connected in a series circuit with the power source 95 and a diode 174B and the resistor 176A, and thus the photocell 194A is connected to the output terminal 178. In like manner, the complementary photocell 194B is connected in a series circuit with the power source 95, a diode 174C and the resistor 176B, and hence the photocell 194B is connected to the complementary output terminal 180 for the third least significant track 40C of the code disc.

The inverters 172 and 182 are transistor stages which are identical and utilize a transistor 184 with a base 186 electrically connected to the output terminal 168, or 170, and a resistor 188 connected to the negative terminal of the power source. The transistor 184 has an emitter 190 also connected to the negative terminal of the power source, and a collector 192 electrically connected to the positive terminal of the power source 95 through a resistor 194.

As illustrated in FIG. 4, the output of the third least significant track 40C, which appears on terminal 178, is utilized through an inverter 196 to excite the lead photocell 201A and the complementary lead photocell 201B which confronts the fourth least significant track 40D. Also, an inverter 198 is electrically connected to the output terminal 180 to invert the complementary output of the third least significant track 40C and excite the lag photocell 200A and the complementary lag photocell 200B which confront the fourth least significant track 40D of the code disc 36. In a manner identical to that described above, the output of the fourth least significant track 40D of the code disc appears on terminal 200, and the complementary output of the fourth least significant track appears on terminal 202. FIG. 4 also shows an identical circuit for producing the output of the fifth least significant track 40E on terminal 201 and the complementary output on terminal 203.

The diodes connected in series with the leading and lagging photocells are for the purpose of decoupling photocells from each other. The diodes, such as diodes 149C, 149D, 149A and 149B which are connected to the photocells of the second least significant track 40B of the code disc, thus prevent deterioration of the output due to the impedance of the nonexcited cell.

The amplifier 96, and the inverter stages driven by the amplifier are mounted on a flexible strip of electrically insulating material 204, and the strip 204 is coiled upon an axis generally corresponding to the axis of the shaft 26 in order to economically place the components of the electronic unit in a relatively small volume. A cover 205 extends about the strip 204 and is mounted on the shell 10 to enclose and partially seal the encoder from the ambient atmosphere. A flat disc 206 of electrically insulating material is disposed in abutment with the disc 50, and a cover ring 208 is cemented into place to seal the open end of the shell 10 to prevent the atmospheric conditions from contaminating or adversely affecting the encoder.

Figure 6:
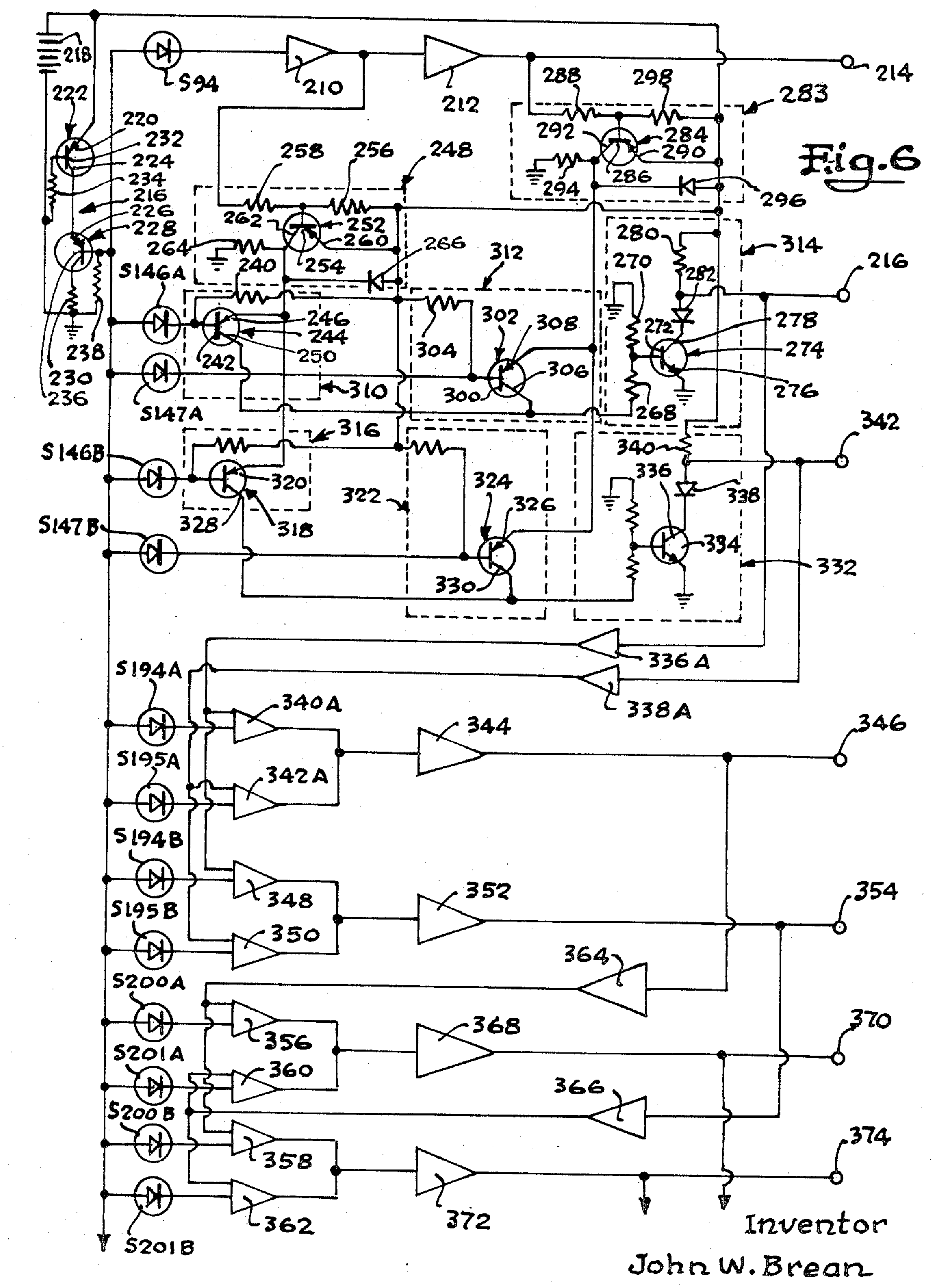
FIG. 6 is a schematic electrical circuit diagram of another embodiment of the encoder of FIGS. 1, 2, 3 and 5.

FIG. 6 is a schematic electrical circuit diagram illustrating another embodiment of the present invention. Mechanically, the encoder of this embodiment is identical to that shown in FIGS. 1, 2 and 5, and the photocells of the encoder are positioned in identical positions to that shown in FIG. 5. For this reason, the photocells bear the same reference numerals as indicated in FIG. 5 with a prefix S to indicate that the cells are silicon photovoltaic cells.

The photocell S 94 confronts the track 40A of least significance, and the output of the cell S 94 is connected through two amplifiers 210 and 212 to an output terminal 214 which carries the least significant output of the encoder. The amplifier 210 inverts the output of the cell S 94, and the amplifier 212 performs a second inversion so that the output at terminal 214 is amplified but of the same phase as the output of the cell S 94. Operation of the silicon cell S 94 is the same as that which will be described with regard to the cells confronting the next more significant track, the circuits for these cells being shown in detail.

The next more significant track 40B has two pairs of photocells confronting the track 40B of next greater significance on the side opposite the light source, the first of these pairs being the lag photocell S 146A and the lead photocell S 147A. The second pair of photocells produces the complementary output including the complementary lag photocell S 146B and the complementary lead photocell S 147B.

The silicon cells are photodiodes, and they are provided with a back bias generated by a temperature compensated bias source 216. The bias source 216 has a direct current source or battery 218 which has its positive terminal connected to the emitter 220 of a transistor 222. The transistor 222 has a collector 224 connected to the emitter 226 of a second transistor 228. A continuous circuit from the positive terminal to the negative terminal through the transistors 222 and 228 is provided by a resistor 230 connected to the collector 232 of transistor 228. The base 232 of transistor 222 is biased through a resistor 234 connected to the negative terminal of the battery 218, and the base 236 of transistor 228 is likewise biased by a resistor 238 connected to the negative terminal of the battery 218. The base 236 of transistor 228 is connected to the emitter of all photodiodes in the encoder, the connections to photocell S 94 and photocells 146A and 146B, and 147A and 147B, as well as the photodiodes confronting the next two more significant tracks of the encoder to be described hereinafter being shown in FIG. 6.

Photodiode S 146A has a resistor 240 connected from its base to the positive terminal of the power source 218, thus biasing the base of the photodiode S 146A above the potential of the bias source 216 on the emitter thereof. Hence in the nonilluminated condition, the photodiode S 146A is substantially non-conducting. However, when the photodiode 146A is illuminated, conduction will occur, thus lowering the potential of the junction between the resistor 240 and the base of the photodiode S 146A.

The base of the photodiode S 146A is connected to the base 242 of a transistor 244. The transistor 244 has an emitter 246 which is connected to a switching circuit 248, and a collector 250 connected to a further amplifier circuit to be described hereinafter. The switching circuit 248 is connected to the output of the inversion amplifier 210 through a resistor 258. Hence the output of the photodiode S 94 confronting the least significant track 40A of the encoder is inverted before being applied to the base 254 of the switching transistor 252. The transistor 252 also has an emitter 260 connected to the positive terminal of the power source 218 and a collector 262 connected to the negative terminal of the power source 218 through a resistor 264. A diode 266 is also connected between the emitter 260 and the collector 262, and the collector 262 is connected to the emitter 246 of the transistor 244.

During periods in which the photodiode S 94 is nonilluminated, the potential of the base 254 of the switching transistor 252 will be sufficiently high to permit conduction through the transistor 252. As a result, a positive potential will be applied to the emitter 246 of transistor 244, thereby causing transistor 244 to conduct. Transistor 244 thereupon functions to amplify any signal from the photodiode S 146A. It will be noted that this is precisely the condition desired for the lagging photocell 146A confronting the track of next greater significance from that of photodiode S 94.

The current return circuit for transistor 244 includes serially connected resistors 268 and 270 connected from the collector 250 to the negative terminal of the power source. The base 272 of a transistor 274 is connected at the junction between the resistors 268 and 270, and the transistor 274 is connected in an amplifier circuit. The transistor 274 has an emitter 276 connected to the negative terminal of the power source 218, and a collector 278 connected to the positive terminal of the power source 218 through a resistor 280 and a diode 282. The junction between the diode 282 and the resistor 280 is connected to a terminal 216 to produce the output for the next most significant track of the encoder.

In the event photocell S 94 is illuminated, the output of inverter amplifier 210 will not excite transistor 252 to cause the switching stage 248 to place the positive potential on the emitter 246 of transistor 244 and permit this transistor to conduct. Hence photocell 146A will not produce an output on the output terminal 216 whether or not it is illuminated. As will be indicated hereinafter, photodiode S 147A will in response to its illumination place an output on terminal 216.

A second switching stage 283 employs a transistor 284 with a base 286 connected to the output of the second inverting amplifier 212 through a resistor 288. Hence, the base 286 of transistor 284 is driven out of phase with the base 254 of transistor 252 of switching stage 248. Transistor 284 is connected in a circuit identical to transistor 252 in that it has an emitter 290 connected to the positive terminal of the power source 218 and a collector 292 connected to the negative terminal of the power source 218 through a resistor 294. A diode 296 is also connected between the positive terminal of the power source 218 and the collector 292, and a resistor 298 is connected between the base 286 and the positive terminal of the power source.

Photodiode S 147A has its base connected to the base 300 of a transistor 302, the transistor 302 being connected in an amplifier circuit identical to that of the transistor 244. The base 300 of transistor 302 is also connected to the positive terminal of the power source 218 through a resistor 304. Also, the transistor 302 has a collector 306 which is directly connected to the collector 250 of the transistor 244. The emitter 308 of the transistor 302 is connected to the collector 292 of transistor 284 of the switching stage. Hence, when photodiode S 94 confronting the least significant track 40A of the encoder is illuminated, switching stage 283 will be actuated so that transistor 284 draws current through its emitter to collector circuit and places a positive potential on the emitter 308 of transistor 302. As a result, current will flow through transistor 302, and the output of photodiode S 147A will be impressed upon the amplifier circuit of transistor 274 and the output terminal 216.

It will be noted that the switching stages 248 and 283 have been indicated in dashed lines for clarity. Likewise, the amplifier circuit of transistor 244, designated 310, and the amplifier of transistor 302, designated 312 have been shown in closed and dashed lines. The output amplifier 314 employing transistor 274 has been indicated in the same manner.

Photodiode S 146B, which is the complementary lagging photodiode, has its base connected to an amplifier 316 which is identical in construction to the amplifier 310. The amplifier 316 has a transistor 318 with an emitter 320 connected to the collector 262 of the switching device 248, and hence the amplifier 316 is activated at the same time and in the same manner as the amplifier 310.

The photodiode S 147B, which is the complementary leading photodiode confronting the track 40B, is also connected to an amplifier 322 which is identical to the amplifier 312. The amplifier 322 uses a transistor 324 which has an emitter 326 directly connected to the collector 292 of transistor 284 of the switching device 283. As a result, amplifier 322 is actuated at the same times as the amplifier 312. Transistor 318 has a collector 328 which is connected directly to the collector 330 of transistor 324, and these collectors are connected to the input of an amplifier 332 which is identical to the amplifier 314. The amplifier 332 uses a transistor 334 with a collector 336 connected to the positive terminal of the power source through a diode 338 and a resistor 340, and an output terminal 342 is directly connected to the junction between the diode 338 and the resistor 340. The complementary output for the second least significant track of the code disc appears on terminal 342.

It will be noted that the absence of an output from photodiode S 94 results in the switching device 248 enabling the amplifiers 310 and 316. Hence lagging photocell 146A and complementary lagging photocell 146B will produce either a "1" or a "0" on the output terminals 216 or 342, respectively. Because of the construction of the code disc 36, either photocell 146A or photocell 146B must be illuminated, and hence one of the outputs will be a "1" and the other a "0." Likewise, under these conditions switching device 283 has deactuated amplifiers 312 and 322 so that no output can be transmitted from photodiodes S 147A and 147B to the output terminals. If the output from photodiode S 94 is the opposite, namely a "1," then amplifiers 312 and 322 will be deactivated and photodiodes S 147A and S 147B will generate the output on the terminals 216 and 342, respectively.

It will be recognized that the switching devices 248 and 283 are essentially inverters, and identical switching devices 336A and 338A are connected to the terminals 216 and 342, respectively, for controlling the outputs of the photodiodes confronting the next more significant track 40C or the code disc 36 of the encoder. Lagging photocell S 194A and leading photocell S 195A, and complementary lagging photocell S 194B and complementary leading photocell S 195B confront the track 40C of the code disc. The base of photodiode S 194A is connected to the input terminal of an amplifier 340A which is identical to the amplifier 310 and which is actuated by the output of the switching stage 336A. Also, the base of photodiode S 195A is connected to the input of amplifier 342A which is identical to amplifier 312 and is actuated by the output of switching stage 338A. The outputs of amplifier 340A and 342A are combined at the input of an amplifier 344 which is identical to the amplifier 314. The output of amplifier 344 is connected to a terminal 346 which represents the output of track 40C of the code disc.

In like manner, the base of photodiode S 194B is connected to the input of an amplifier 348 which is also enabled by the output from the switching circuit 336A. The base of photodiode S 195B is connected to the input of an amplifier 350 which is also connected to the output of amplifier 338A and enabled by the output thereof. The outputs of the amplifiers 348 and 350 are combined at the input of an amplifier 352 which is identical to the amplifier 322, and the output of the amplifier 352 is connected to an output terminal 354 which carries the complementary output from the track 40C of the code disc 36.

The next track of greater significance, 40D, has two pair of photocells confronting it in a manner identical to the tracks 40B and 40C, these photocells being designated S 200A, S 200B, S 201A, and S 201B. The base of each of these photocells is connected to the input of an amplifier, the amplifiers being designated, respectively, 356, 358, 360, and 362. An inverter or switching stage 364 is connected between the output terminal 346 and enabling inputs of amplifiers 356 and 358, and an inverter or switching stage is connected between output terminal 354 and the enabling inputs of amplifiers 360 and 362. The outputs of amplifiers 356 and 360 are combined at the input of an amplifier 368, the output of this amplifier being connected to an output terminal 370 for the output for track 40D. In like manner, the outputs of amplifiers 358 and 362 are combined at the input of an amplifier 372, and the output of the amplifier 372 is connected to terminal 374 for the complementary output of the track 40D.

It is to be understood that all of the tracks of the encoder may be read in the manner indicated, and that the circuit may simply be extended as indicated by the arrows drawn to the photocell bias common conductor and the output and complementary output terminals for the track 40D.

Those skilled in the art will readily devise many modifications of the present invention and many utilities therefor beyond that here set forth. It is therefore intended that the scope of the present invention be not limited by the foregoing specification, but rather only by the appended claims.

The invention claimed is:

1. A device for digitally encoding the position of a movable element comprising, in combination: a code member adapted to be mechanically coupled to the movable element to be encoded and to move in response to movement of the element to be encoded, said code member defining a plurality of tracks consisting of alternate transparent and opaque sectors of equal length, each track defining a path parallel to the direction of movement of the code member, the transparent and opaque sectors of one of said tracks being one half the length along the path of the transparent and opaque sectors of a second track, a light source disposed on one side of the code member for illuminating at least a portion of the first and second tracks of the code member, a first photocell disposed on the side of the code member opposite the light source confronting the illuminated portion of said one track of the code member, said first photocell being disposed on a first fixed axis relative to the code member normal to the path of movement of the said one track, a first pair and a second pair of photocells mounted in fixed positions relative to the code member on the side of the code member opposite the light source confronting the illuminated portion of the second track of the code member, the photocells of the first pair being disposed on a first pair of axes normal to the path of the second track and spaced by a distance between one-half the length and one and one-half times the length of the sectors of the second track, the first axis of said first pair confronting a portion of a sector of the second track higher in count than the portion of the second track confronted by the first axis, the photocells of the second pair being disposed on a second pair of axes normal to the path of the second track and spaced by a distance between one-half the length and one and one-half times the length of the sectors of the second track, the first axis of said second pair confronting a portion of a sector of the second track lower in count than the portion of the second track confronted by the first axis, and means electrically connected to the photocells for electrically reading the output of the photocells, said means having a first output terminal, a second output terminal and a third output terminal upon each of which a first electrical output is produced to indicate an illuminated photocell and a second electrical output is produced to indicate a photocell in the dark, the electrical output of the first photocell exciting the first output terminal, the electrical output of the photocell of each pair confronting the first axes thereof exciting the second output terminal, and the electrical output of the photocell of each pair confronting the second axes thereof exciting the third output terminal, and a selection device electrically connected between the first photocell and the first and second pairs of photocells, said selection device being responsive to an electrical output on the first output terminal of the first type to select the responses of the first pair of photocells and responsive to an output on the first terminal of the second type to select the second pair of photocells for the second and third output terminals, whereby the electrical output on the first and second output terminals represents the position of the code member in binary numbers and the electrical signal on the third output terminal represents the binary complement of the electrical signal on the second output terminal.

2. A device for digitally encoding the position of a movable element comprising the combination of claim 1 wherein the code member has a third track with transparent and opaque sectors with lengths four times that of the first track, a portion of said third track being illuminated by the light source, and said device having a third pair and a fourth pair of photocells mounted in fixed positions relative to the code member on the side of the code member opposite the light source confronting the illuminated portion of the third track of the code member, the photocells of the third pair and fourth pair being disposed on a third pair and fourth pair of axes normal to the path of the third track and spaced by a distance approximately equal to the length of the sectors of the third track, respectively, the one axis of said third pair confronting a portion of a sector of the third track higher in count than the portion of the sector of the third track confronting the first axis, the one axis of said fourth pair confronting a portion of one of the sectors of the third track lower in count than the portion of the sector of the third track confronting the first axis, and the means for electrically reading the output of the cells electrically connected to the second and third output terminals including a fourth and a fifth output terminal, the photocell of the third and fourth pair confronting the first axes thereof electrically exciting the fourth output terminal, the photocell of the third and fourth pair confronting the second axes thereof electrically exciting the fifth output terminal, said selection device being responsive to an electrical output on the second output terminal of the first type to select the responses of the third pair, and said selection device being responsive to an electrical output on the third output terminal of the first type to select the responses of the fourth pair.

3. A device for digitally encoding the position of a movable element comprising the combination of claim 1 wherein the photocells comprise two spaced electrodes and a mass of photoresistive material disposed therebetween.

4. A device for digitally encoding the position of a movable element comprising the combination of claim 3 wherein the selection means comprises a source of potential and a first resistor connected in a series circuit with the first photocell; a first means for impressing a potential on the first pair of photocells responsive to a potential on the first resistor including a first series circuit comprising the first photocell of the first pair and a second resistor, and a second series circuit comprising the second photocell of the first pair, and a third resistor; a second means for impressing a potential on the second pair of photocells including an inverter and a third and fourth series circuit, said second means including a third series circuit comprising the first photocell of the second pair of photocells and the second resistor, and a fourth series circuit comprising the second photocell of the second pair of photocells and the third resistor; the first output terminal being electrically connected to the first resistor, the second output terminal being electrically connected to the second resistor, and the third output terminal being electrically connected to the third resistor.

5. A device for digitally encoding the position of a movable element comprising the combination of claim 4 in combination with a diode connected in series with each of the first, second, third and fourth series circuits.

6. A device for digitally encoding the position of a movable element comprising the combination of claim 1 wherein the photocells are photovoltaic.

7. A device for digitally encoding the position of a movable element comprising the combination of claim 6 wherein the selection means comprises a bias source connected to the emitter of each of the photocells, a plurality of amplifiers, the input of a separate amplifier being connected to the base of each of the photocells, the input of each of said amplifiers being at a potential to back bias the photocell connected thereto when said photocell is in the dark, but insufficient to back bias said photocell when illuminated.

8. A device for digitally encoding the position of a movable element comprising the combination of claim 7 wherein the selection means comprises a switching device controlled by the output of the first photocell and electrically connected to the amplifiers connected to the photocells of the first pair to activate said amplifiers only in response to an output from the first photocell of the first type.

9. A device for digitally encoding the position of a movable element comprising the combination of claim 8 wherein the selection means includes a second switching device coupled to the first photocell and being controlled by the first photocell, said second switching device being electrically connected to the amplifiers connected to the photocells of the second pair to actuate said amplifiers only in response to an output from the first photocell of the second type.

* * * * *